Dec. 10, 1957  H. M. McKAY  2,815,962
LANDING GEAR FOR TRUCK TRAILER
Filed June 4, 1954  3 Sheets-Sheet 1
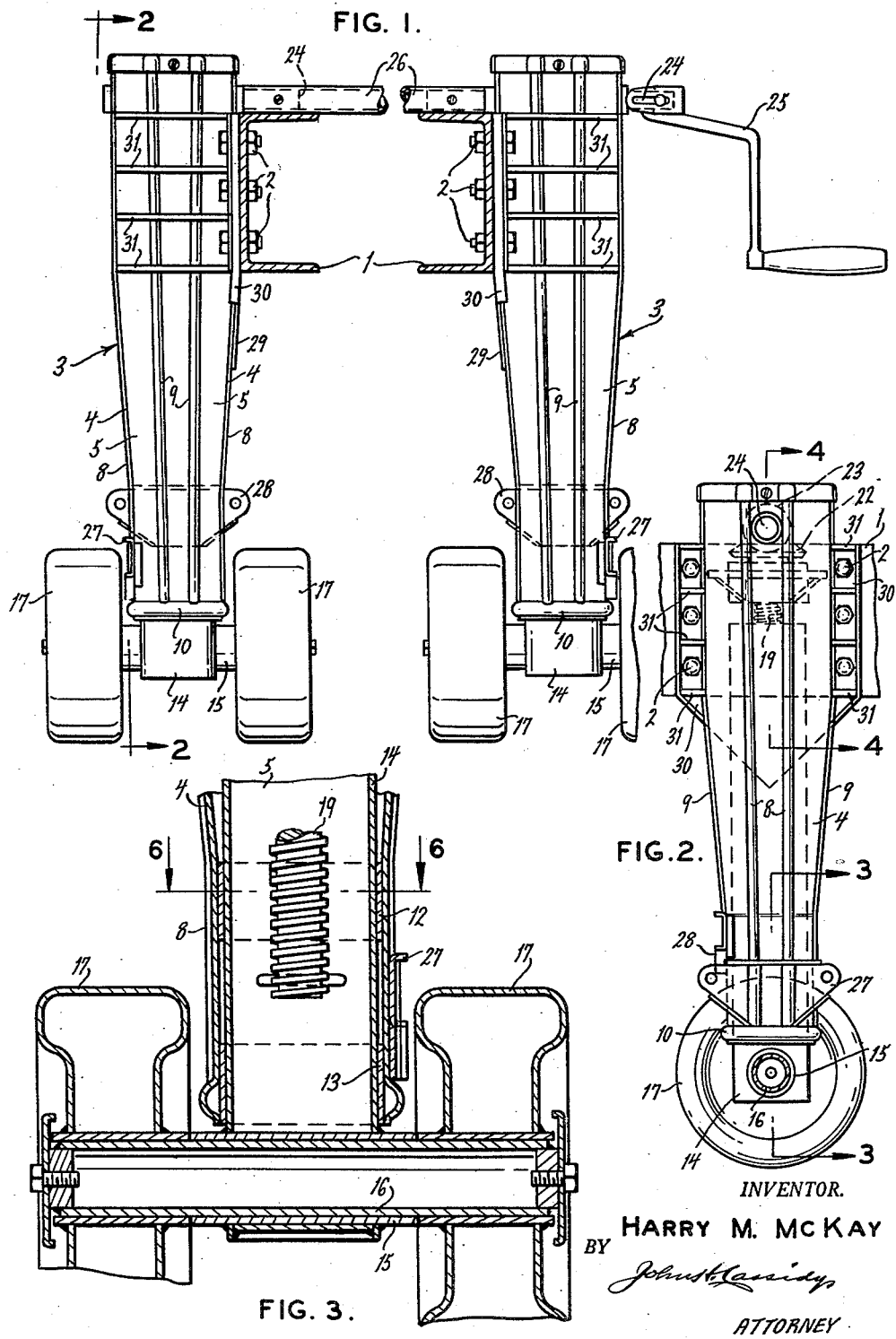
INVENTOR.
HARRY M. McKAY
BY John H. Cassidy
ATTORNEY

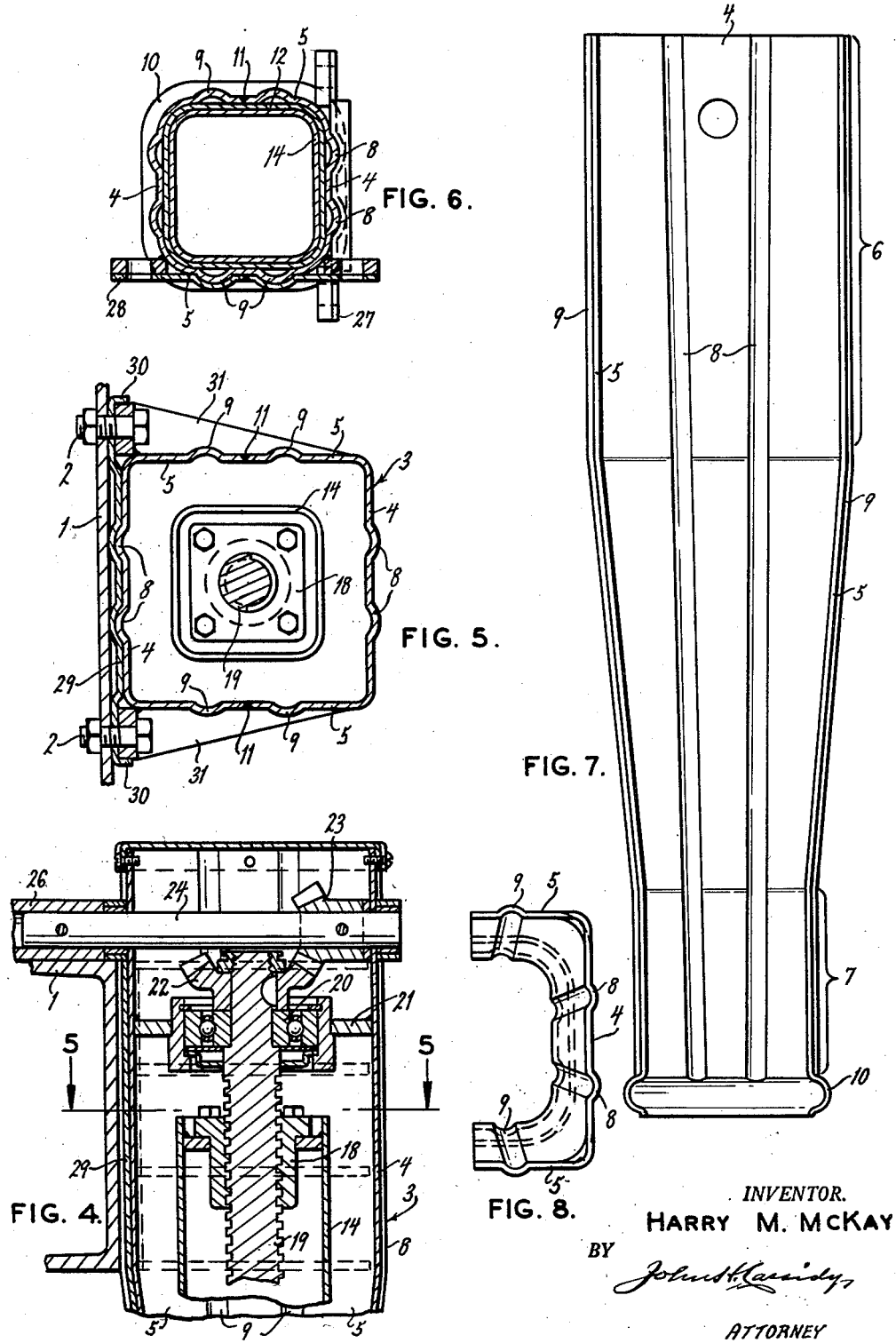

Dec. 10, 1957  H. M. McKAY  2,815,962
LANDING GEAR FOR TRUCK TRAILER
Filed June 4, 1954  3 Sheets-Sheet 3

INVENTOR.
HARRY M. McKAY
BY
*John H. Cassidy*
ATTORNEY

United States Patent Office 2,815,962
Patented Dec. 10, 1957

2,815,962

LANDING GEAR FOR TRUCK TRAILER

Harry M. McKay, Warrenton, Mo.

Application June 4, 1954, Serial No. 434,471

2 Claims. (Cl. 280—150.5)

This invention pertains to a so-called landing gear used on trailer trucks for supporting the front end of the trailer when disconnected from the tractor.

An object of this invention is to provide a simple and inexpensive construction for such landing gear which will yet be rugged and capable of withstanding hard service.

A preferred embodiment of this invention is illustrated in the accompanying drawings, in which—

Fig. 1 is a rear view with parts broken away and parts in section of a landing gear embodying this invention and showing one way of attaching it to the trailer body;

Fig. 2 is a side view partly in section on line 2—2 of Fig. 1;

Fig. 3 is an enlarged detail section on line 3—3 of Fig. 2;

Fig. 4 is an enlarged section on line 4—4 of Fig. 2;

Fig. 5 is a section on line 5—5 of Fig. 4;

Fig. 6 is a section on line 6—6 of Fig. 3;

Fig. 7 is an inside view of one of the leg halves;

Fig. 8 is a top view of Fig. 7;

Figure 9:
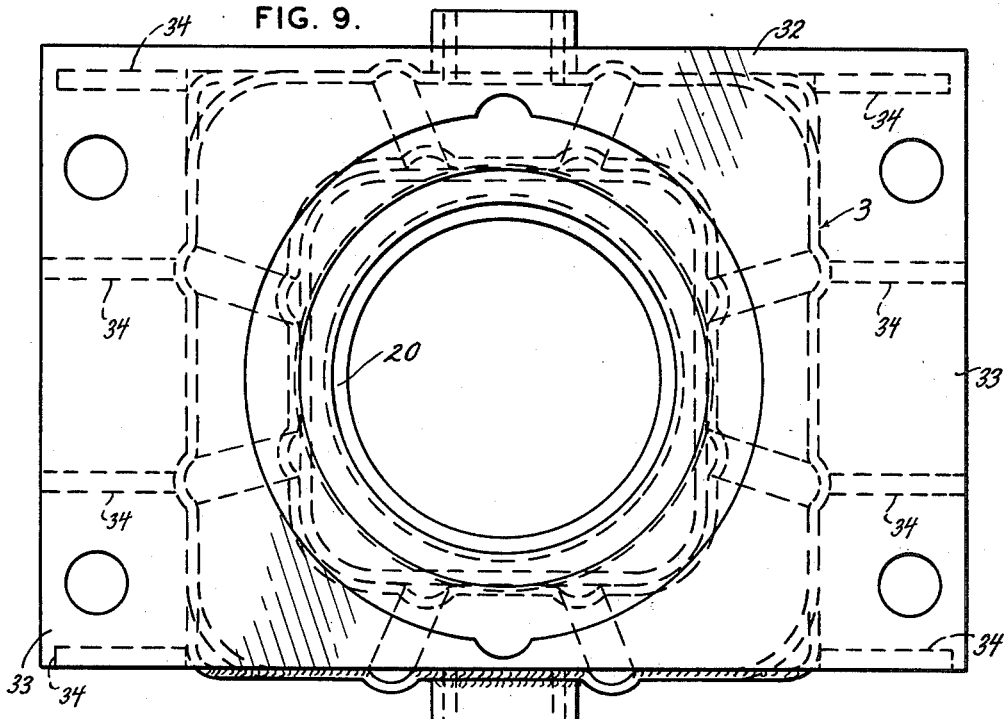
Fig. 9 is a top view of a mounting bracket to be used for attaching the legs to a horizontal surface of the trailer structure.

In accordance with this invention, the landing gear comprises a pair of legs extending downward from the trailer body. Vertically movable in each leg is a strut member equipped at its lower end with wheels. Means are provided for moving the strut member downward so as to bring the wheels into contact with the ground when the tractor is to be separated from the trailer.

Referring to the drawings, 1 designates the trailer chassis, represented in this figure by a pair of channels running lengthwise of the trailer body. Attached to the channels 1 by bolts 2 or otherwise are legs, each indicated generally at 3.

Each of the legs 3 is made of sheet metal of suitable gauge. Each leg is further constructed of two halves, each of which is formed to the shape shown in Figs. 7 and 8. This is generally a channel form including a web 4 and flanges 5. The upper section 6 of the channel has straight sides as shown in Fig. 7. Similarly, the lower section 7 also has straight sides but is smaller than the upper section 6. Between these two sections, an intermediate section is tapered so as to be reduced in size from that of section 6 to that of section 7. This half-leg may be formed by pressing in a suitable forming die. It is further provided along the web 4 with a pair of beads 8. These beads project outward from the web 4 and taper continuously toward each other from top to bottom of the leg half. Similarly, each of the flanges 5 is formed with a similar bead 9 which also has a continuous taper from top to bottom, being nearer to the end of the flange at the bottom than at the top, as shown in Fig. 8. The bottom of the leg half is formed with a bead 10 extending peripherally around the bottom of the leg half. The complete leg is formed by joining two leg halves, as show in Figs. 7 and 8 at the edges of their flanges 5 as by welding, as indicated at 11 in Fig. 5. This forms a box-shaped leg of square cross-section tapered from top to bottom and stiffened by the beads 8 and 9.

Mounted in the lower end of each leg is a pair of guide collars 12 and 13, in which is guided for vertical movement a retracting tube 14 providing the strut member mentioned above. Mounted in the lower end of the tube 14 is a bearing sleeve 15. Supported in the sleeve 15 is a tube axle 16. This axle projects from both ends of the sleeve 15 and has mounted on each end thereof a road wheel 17. Since the leg 3 has a substantially rectangular cross-section, the collars 12 and 13 will have a similar shape. The retracting tube 14 is also made rectangular so as to fit within these collars. It will be seen that this combination provides that while the tube 14 may slide axially through the collars 12 and 13, it is held against rotation by the rectangular shape. Accordingly, the whole structure is stiffened against any tendency for the wheels 17 to twist on the tube 14 when encountering rough places in the road.

Secured in the upper end of the tube 14 is a nut 18, Fig. 4, into which is threaded a hoisting screw 19, the upper end of which is mounted in a ball-bearing 20 secured in the upper end of the leg by a plate 21. The upper end of the screw 19 has a bevel gear 22 keyed thereto. The gear 22 is arranged to mesh with a complementary bevel gear 23 fixed to a horizontal shaft 24 journaled in suitable bearings in the upper end of the leg 3 and equipped with an operating handle 25 by which it may be rotated. Any well known type of gearing may be employed for this purpose. By means of the handle 25, the shaft may be rotated to rotate the screw 19 so as to extend or retract the tube 14. When the tractor is to be separated from the trailer, the screw 19 is operated in this manner to move the tube 14 downward until it extends far enough below the leg 3 to bring the wheels 17 into contact with the ground to support the front end of the trailer. When the tractor is to be re-connected to the trailer, the reverse of this operation is carried out.

Where two of the legs 3 are employed, as shown in Fig. 1, these shafts 24 of the two may be connected in any suitable manner, as by a sleeve 26, Fig. 1, so that when one of the screws 19 is operated, the other is also operated simultaneously in the same direction.

The lower end of the leg 3 may have attached thereto side brackets 27 and 28 by which suitable angle braces may be attached to the legs for bracing them to other parts of the chassis of the trailer.

The upper end of the leg may be provided with a mounting bracket having a main web portion 29 formed to fit the upper section 6 of the leg 3, as shown in Fig. 5. This bracket is formed with a vertically extending channel portion 30 on each side thereof and a series of angle braces 31 are secured by welding or otherwise to the bracket 29 and to the leg 3, as shown in Fig. 5. The channel portion 30 is perforated to provide holes for the bolts 2 for mounting the leg on the chassis.

Figure 10:
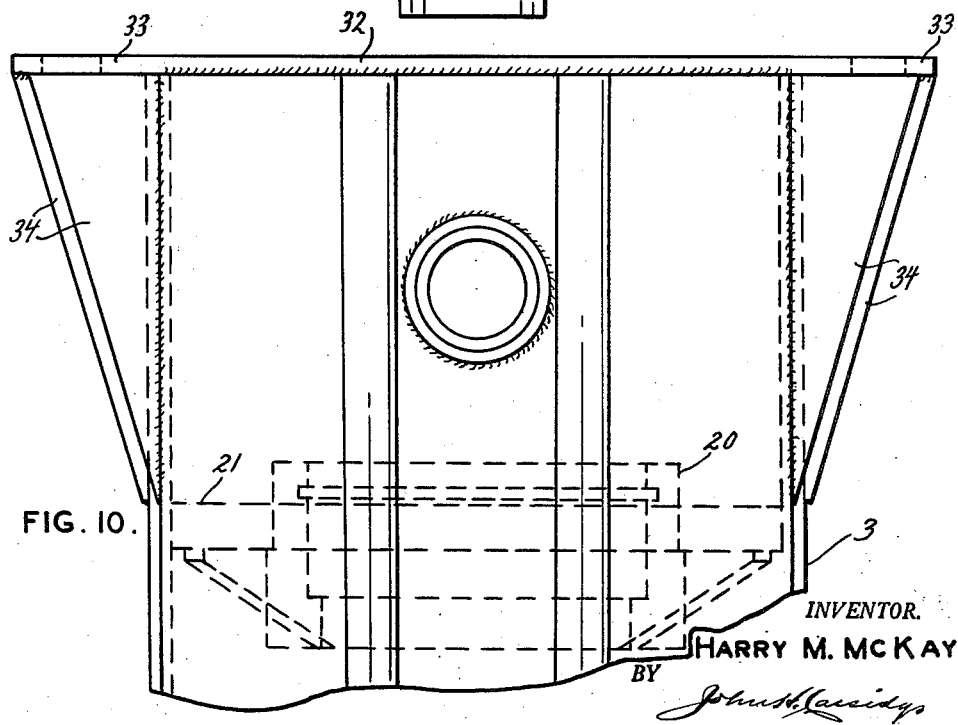
Fig. 10 is a side view of Fig. 9.

In the arrangement shown in Figs. 9 and 10, the mounting bracket comprises a horizontal abutment plate 32 which is placed across the top of the assembled leg halves and is secured thereto by welding or otherwise. The plate is made long enough to overhang the sides of the leg, as shown at 33, and this portion of the plate is reinforced by a series of gussets 34 extending downward along the leg. These gussets are also secured to both the plate 32 and the leg, usually by welding. This arrangement provides a very strong structure and one which is conveniently mounted on the trailer, either by attachment to the lower horizontal flange of the channel 1 or to a suitable bridging member, not shown, mounted between these flanges. In this arrangement, the thrust of the load is delivered to the leg along its axis so that there is no twisting or distorting.

It has been found that this invention provides a form of leg for a landing gear of this type which is very strong and capable of withstanding rough usage. At the same time, its construction is cheap to make.

Various changes may be made in the details of construction, within the scope of the appended claims, without departing from the spirit of this invention. Parts of the invention may be used without the whole and improvements may be added while retaining some or all of the advantages of the invention.

I claim:

1. In a landing-gear for truck trailers, a leg housing comprising, a pair of press-formed channel-shaped sheet-metal leg halves, said halves being secured together along longitudinal seams forming a housing of generally rectangular cross-section, said housing having parallel-sided sections adjacent its top and bottom ends, the upper of said sections being larger than the lower, and a tapered section joining said end sections, a pair of stiffening beads press-formed to extend along substantially the entire length of a side face of said housing, the spacing of said beads from each other being continuously tapered from end to end thereof.

2. In a landing-gear for truck trailers, a leg housing comprising, a pair of press-formed channel-shaped sheet-metal leg halves, said halves being secured together along longitudinal seams forming a housing of generally rectangular cross-section, said housing having parallel-sided sections adjacent its top and bottom ends, the upper of said sections being larger than the lower, and a tapered section joining said end sections, a pair of stiffening beads press-formed to extend along substantially the entire length of a side face of said housing, the spacing of said beads from each other being continuously tapered from end to end thereof, and a mounting bracket including an abutment plate secured in horizontal position across the top of said assembled leg halves and gussets extending downward from said plate along said leg halves and secured to both thereof.

References Cited in the file of this patent

UNITED STATES PATENTS

| | | |
|---|---|---|
| 926,097 | Carl et al. | June 29, 1909 |
| 970,637 | Morris | Sept. 20, 1910 |
| 1,678,392 | Hursh et al. | July 24, 1928 |
| 1,898,384 | Noros | Feb. 21, 1933 |
| 2,047,346 | Weston | July 14, 1936 |
| 2,082,033 | Seyferth | June 1, 1937 |
| 2,347,524 | Swan | Apr. 25, 1944 |
| 2,422,210 | Reisch | June 17, 1947 |
| 2,446,517 | Black | Aug. 10, 1948 |
| 2,464,890 | Premo | Mar. 22, 1949 |
| 2,499,625 | Black | Mar. 7, 1950 |
| 2,523,152 | Seyferth | Sept. 19, 1950 |

FOREIGN PATENTS

| | | |
|---|---|---|
| 136,596 | Australia | Apr. 17, 1947 |